(12) United States Patent
Agam et al.

(10) Patent No.: US 10,977,950 B2
(45) Date of Patent: Apr. 13, 2021

(54) SYSTEM FOR PRODUCING A FLIGHT PLAN

(71) Applicants: Leedor Agam, Tel Aviv (IL); David Agam, Savyon (IL)

(72) Inventors: Leedor Agam, Tel Aviv (IL); David Agam, Savyon (IL)

( * ) Notice: Subject to any disclaimer, the term of this patent is extended or adjusted under 35 U.S.C. 154(b) by 0 days.

(21) Appl. No.: 16/114,245

(22) Filed: Aug. 28, 2018

(65) Prior Publication Data

US 2018/0366010 A1 Dec. 20, 2018

Related U.S. Application Data

(62) Division of application No. 12/331,454, filed on Dec. 10, 2008, now abandoned.

(60) Provisional application No. 61/012,469, filed on Dec. 10, 2007.

(51) Int. Cl.
*G08G 5/00* (2006.01)
*G01C 23/00* (2006.01)

(52) U.S. Cl.
CPC ......... *G08G 5/0034* (2013.01); *G01C 23/005* (2013.01)

(58) Field of Classification Search
CPC ............................ G08G 5/0034; G01C 23/005
See application file for complete search history.

(56) References Cited

U.S. PATENT DOCUMENTS

| | | | | |
|---|---|---|---|---|
| 5,703,591 | A * | 12/1997 | Tognazzini | G01S 5/0027 342/176 |
| 6,134,500 | A * | 10/2000 | Tang | G06Q 10/047 701/10 |
| 7,272,491 | B1 * | 9/2007 | Berard | G06Q 10/047 701/14 |
| 7,437,225 | B1 * | 10/2008 | Rathinam | G08G 5/0013 340/961 |
| RE41,381 | E * | 6/2010 | Stabile | A62B 7/14 244/118.5 |
| 2007/0150178 | A1 * | 6/2007 | Fortier | G08G 5/0034 701/467 |
| 2007/0233331 | A1 * | 10/2007 | Caillaud | G08G 5/0052 701/3 |

(Continued)

FOREIGN PATENT DOCUMENTS

EP 3007153 A2 * 4/2016 .......... G08G 5/0026

OTHER PUBLICATIONS

Jim Sparks "Flight Management Systems, Piloting skills are being supplemented with proficiency in varying kinds of computer technology"; 22 pages (Year: 2006).*

*Primary Examiner* — Kira Nguyen
(74) *Attorney, Agent, or Firm* — Mark M. Friedman

(57) ABSTRACT

A flight planning system includes one or more flight management system and a flight plan manager that constructs a flight plan according to static information from the flight management system. A flight management system that also constructs flight plans includes a flight plan manager that constructs a flight plan according to information stored in the flight management system. In constructing the flight plan, either flight management system may compute values of flight plan parameters, such as PNR, PET, ETOPS and LROPS, based on dynamic information related to the flight. On the ground, one of either type of flight management system is selected from a plurality thereof for producing a flight plan for a respective aircraft or aircraft model.

21 Claims, 8 Drawing Sheets

(56) References Cited

U.S. PATENT DOCUMENTS

| | | | | |
|---|---|---|---|---|
| 2008/0071434 A1* | 3/2008 | Fortier | ............... | G08G 5/0034 |
| | | | | 701/15 |
| 2008/0119969 A1* | 5/2008 | McCullough | ........ | G01C 23/005 |
| | | | | 701/3 |
| 2008/0312776 A1* | 12/2008 | Sylvester | ............ | G08G 5/0039 |
| | | | | 701/3 |
| 2008/0312779 A1* | 12/2008 | Sacle | ................... | G01C 23/005 |
| | | | | 701/7 |
| 2009/0005967 A1* | 1/2009 | Rumbo | ............... | G08G 5/0034 |
| | | | | 701/410 |

* cited by examiner

| Airway (SID-STAR) | Frequency | Position | Coordinates | Mag Track | G/S | Dist | Time | ETO | ATO | Time Diff +/- Minutes | Est Fuel remaining Kg | Actual Fuel remaining Kg | Fuel remaining Diff+/- Kg |
|---|---|---|---|---|---|---|---|---|---|---|---|---|---|
| TLV | Climb | FL300 | | | | | | | | | | | |
| (DEENA) | 113.50 | BGN | N3200.9 E03452.5 | | | 000 | 0:00 | | | | 136605 | | |
| (DEENA) | | SIX | N3159.6 E03446.1 | 254 | 255 | 005 | 0:01 | | | | | | |
| xxxx | xxxx | xxxx | xxxx | xxxx | xxxx | xxxx | xxxx | xxxx | xxxx | xxxx | xxxx | xxxx | xxxx |
| (DEENA) | | SUVAS | N3210.0 E03359.0 | 298 | 347 | 015 | 0:03 | | | | | | |
| NICOSIA | FIR | LCCC | Acc. Dist | Dist | | 048 | 0:09 | | Acc. time | | <<<<< | <<<<< | <<<<< |
| UL53 | | TOC | N3249.3 E03235.0 | 296 | 418 | 081 | 0:11 | | | | 128000 | | |
| >>>>>> | >>>>>> | FL300 | Acc. Dist | Dist | | 129 | 0:20 | | Acc. time | | <<<<< | <<<<< | <<<<< |
| xxxx | xxxx | xxxx | xxxx | xxxx | xxxx | xxxx | xxxx | xxxx | xxxx | xxxx | xxxx | | |
| (SHAFF) | 117.70 | IGN | N4139.9 W07349.3 | 267 | 419 | 053 | 0:08 | | | | 013900 | | |
| (SHAFF) | | TOD | N4139.2 W07351.6 | 266 | 421 | 002 | 0:00 | | | | 013900 | | |
| (SHAFF) | xxxx | xxxx | xxxx | xxxx | xxxx | xxxx | xxxx | | | | xxxx | xxxx | xxxx |
| (SHAFF) | 115.70 | SAX | N4104.1 W07432.3 | 211 | 335 | 014 | 0:03 | | | | | | |
| (SHAFF) | | EWR | N4041.5 W07410.1 | 156 | 330 | 105 | 0:19 | | | | 012400 | | |

*Figure 3*

| W/N Airway (SID-STAR) | OAT Freqency | MSA Position | Coordinates | Mag Track | G/S | Dist | Time | ETO | ATO | Time Diff +/- Minutes | Estimated Fuel remaining Kg | Actual Fuel remaining Kg | Fuel remaining Diff+/- Kg |
|---|---|---|---|---|---|---|---|---|---|---|---|---|---|
| TLV | Climb | FL300 | | | | | | | | | 136605 | | |
| 330/005 (DEENA) | P25 113.50 | 043 BGN | N3200.9 E03452.5 | | | 000 | 0:00 | | | | | | |
| 325/005 (DEENA) | P21 | 043 SIX | N3159.6 E03446.1 | 254 | 255 | 005 | 0:01 | | | | | | |
| xxxx | xxxx | xxxx | xxxx | xxxx | xxxx | xxxx | xxxx | xxxx | xxxx | xxxx | xxxx | xxxx | xxxx |
| 275/007 (DEENA) | M05 | 011 SUVAS | N32100.0 E033359.0 | 298 | 347 | 015 | 0:03 | | | | | | |
| NICOSIA | FIR | LCCC | Acc. Dist → | | | 048 | 0:09 | → Acc. time | | | | | |
| 285/018 UL53 | M16 | 010 TOC | N32235.0 E033235.0 | 296 | 418 | 081 | 0:11 | | | | 128000 | | |
| >>>>> | >>>>> | FL300 | Acc. Dist → | | | 129 | 0:20 | → Acc. time | | | <<<<< | <<<<< | <<<<< |
| xxxx | xxxx | xxxx | xxxx | xxxx | xxxx | xxxx | xxxx | xxxx | xxxx | xxxx | xxxx | xxxx | xxxx |
| 250/079 (SHAFF) | M50 117.70 | 052 IGN | N4139.9 W07349.3 | 267 | 419 | 053 | 0:08 | | | | 013900 | | |
| 250/077 (SHAFF) | M50 | 052 TOD | N4139.2 W07351.6 | 266 | 421 | 002 | 0:00 | | | | 013900 | | |
| xxxx | xxxx | xxxx | xxxx | xxxx | xxxx | xxxx | xxxx | xxxx | xxxx | xxxx | xxxx | xxxx | xxxx |
| 255/070 (SHAFF) | M34 115.70 | 028 SAX | N4104.1 W07432.3 | 211 | 335 | 014 | 0:03 | | | | | xxxx | xxxx |
| (SHAFF) | | EWR | N4041.5 W07410.1 | 156 | 330 | 105 | 0:19 | | | | 012400 | | |

*Figure 4*

SYSTEM FOR PRODUCING A FLIGHT PLAN

This application is a Divisional of commonly owned U.S. patent application Ser. No. 12/331,454, entitled: System for Producing a Flight Plan, filed on Dec. 10, 2008, which is related to and claims priority from U.S. Provisional Patent Application No. 61/012,469, filed Dec. 10, 2007, the disclosures of both of the aforementioned patent applications incorporated by reference in their entireties herein.

FIELD AND BACKGROUND OF THE INVENTION

The present invention relates to the field of aviation, and more particularly, to a system for producing a flight plan.

The definition of "flight plan" used herein is taken from the FAA Airman's Information Manual (2008), Volume 3 General Technical Administration, Chapter 25 Operational Control for Air Carriers, Section 3-1925. The term "flight plan" means a paper document or a file of electronic data prepared for purposes of flight planning, flight control and navigation. Flight planning consists of selecting an appropriate aircraft cruise schedule and applying forecast wind, temperature and aircraft performance data to a planned route to predict estimated time en route (ETE) and estimated fuel consumption.

The term "ATC flight plan" refers herein to a plan filed by a pilot or a flight dispatcher with the aviation authorities (e.g. FAA in the USA) prior to takeoff in order to obtain an ATC clearance. Absent an ATC clearance, the flight is not authorized to depart.

An ATC flight plan is the subset of information extracted from the flight plan, and includes additional information such as departure and arrival points, aircraft registration, estimated times, alternate airports, type of flight, e.g. IFR (instrument flight rules) or VFR (visual flight rules), name of pilot in command (PIC), number of persons on board, and so forth as per an official ATC flight plan form (e.g. FAA form 7233-4).

In most countries, ATC light plans are required for flights under instrument flight rules. Under visual flight rules, ATC flight plans are optional unless the flight crosses national borders, however they are highly recommended, especially when flying over inhospitable areas, such as over water, as they provide a way of alerting rescuers if the flight is overdue.

The term "flight planning" refers in the art to the process of producing a detailed flight plan, and is referred in the prior art as to "flight plan" ("FP"). Flight planning involves two safety-critical aspects: fuel calculation, to ensure that the aircraft can safely reach its destination, and compliance with air traffic control requirements, to minimize the risk of mid-air collision. In addition, planners normally wish to minimize flight cost by appropriate choice of route, height, and speed, and by loading the minimum necessary fuel on board.

Flight planning requires accurate weather forecasts at various flight levels, so that time and fuel consumption calculations can account for the effects of head/tail winds and outside air temperature (OAT). Safety regulations require aircraft to carry fuel beyond the minimum required to fly from departure airport to destination airport, allowing for unforeseen circumstances or for diversion to an alternate airport if the planned destination airport becomes unavailable for landing.

Under the supervision of air traffic control, aircraft flying in controlled airspace must follow predetermined routes (e.g. airways), even if such routes are not as economical as a more direct flight. Within these airways, aircraft must maintain flight altitudes (ALT) or flight levels (FL) as appropriate, depending on the route being flown and the direction of travel. Flying off airways is permitted after attaining approval from the appropriate authorities.

Producing an accurate optimized flight plan requires numerous calculations, so commercial FP systems make extensive use of computers. An approximate un-optimized flight plan can be produced by manual calculations in an hour or so, Some aircraft operators have their own internal system for producing flight plans, while others employ the services of external planners such as Jeppessen of Englewood Colo. USA and Compuflight, Inc. of Port Washington N.Y. USA. In both cases, nowadays producing a flight plan is generally dependent on using computer programs, and as such the pilot has a limited control on the produced flight plan. For example, if the fuel consumption of a Boeing 737 is used for preparing the flight plan instead of the fuel consumption of a Boeing 747, an air disaster may occur.

Acronyms

The following acronyms are used herein:
AFDS autopilot & flight director system
AFS auto flight system
AHRS attitude heading and reference system
A.I.P. aeronautical information publication
ALT flight altitude
A/P autopilot
AFM aircraft flight manual
ALT/FL altitude/flight level
A/T autothrottle
ATC air traffic control
ATIS automatic terminal information service
BR brake release
CAS calibrated airspeed
CPT critical point
DCT direct
DOW dry operating weight
EADI electronic attitude display indicator
EFIS electronic flight instrument system
EHSI electronic horizontal status indicator
ETOPS extended twin-engine operations
ETP equal time point
F/D flight director
F/F fuel flow
FIR flight information region
FL flight level
FMC flight management computer
FMGS flight management and guidance system
FMS flight management system
FOB fuel on board
FP flight plan
FPL flight plan (generally used when referring to an ATC flight plan)
GPS global positioning system
G/S ground speed
IAS indicated airspeed
IFR instrument flight rules
IRS inertial reference system
LMC last minute change
LNAV lateral navigation
LROPS long range operations
MOD moderate turbulence or icing
MPTOW maximum permissible takeoff weight
MR must ride items
MSA minimum safe altitude
MSL mean sea level MTOW maximum design takeoff weight
MZFW maximum zero fuel weight
NAM accumulated air distance
NAT north atlantic ocean
ND navigation display
NM nautical mile
OAT outside air temperature
OCC operations control center
OM operations manual
OTS organized track system
PET point of equal time
PFD primary flight display
PIC pilot in command
PNR point of no return
QNE 1013.25 Mb altimeter subscale setting (International Standard Atmosphere)
QNH altimeter setting to obtain the field elevation when on the ground
RSVM reduced vertical separation minimum
RWY runway
SELCAL selective call
SEV severe turbulence or icing
SID standard instrument departure
STAR standard terminal arrival route
TAS true airspeed
T/O takeoff
TOW takeoff weight
VFR visual flight rules
VNAV vertical navigation
VOR-DME vhf omni range-distance measuring equipment
W/V wind direction and speed
WX weather

SUMMARY OF THE INVENTION

According to the present invention there is provided a flight planning system for producing a flight plan for an aircraft, including: (a) a flight management system; and (b) a flight plan manager for constructing the flight plan in accordance with static information obtained by the flight plan manager from the flight management system.

According to the present invention there is provided a flight management system including: (a) a flight plan manager for constructing a flight plan in accordance with information stored within the flight management system.

According to the present invention there is provided a method of producing a flight plan for a flight, including the steps of: (a) providing, to a flight management system, dynamic information related to the flight; and (b) computing a respective value of at least one parameter of the flight plan, by the flight management system, based at least in part on the dynamic information.

According to the present invention there is provided a method of producing a flight plan for an aircraft, including the steps of: (a) operationally coupling a flight plan manager to a plurality of flight management systems, each flight management system being for a different respective aircraft set; (b) selecting, by the flight plan manager, from among the flight management systems, one the flight management system whose respective aircraft set includes the aircraft; and (c) producing the flight plan, by the flight plan manager, in accordance with to information obtained by the flight plan manager from the one flight management system.

According to the present invention there is provided a method of producing a flight plan for an aircraft, including the steps of: (a) operationally coupling a common front end to a plurality of flight planning systems, each flight planning system being for a different respective aircraft set; (b) selecting, by the common front end, from among the flight planning systems, one the flight planning system whose respective aircraft set includes the aircraft; and (c) producing the flight plan, by a flight plan manager of the one flight management system.

A basic flight planning system of the present invention includes a flight management system, e.g. for a specific aircraft or for a specific aircraft model, and a flight plan manager for constructing the flight plan in accordance with static information obtained by the flight plan manager from the flight management system. "Static" information is defined herein as information that does not change from flight to flight, for example, performance characteristics of the specific aircraft or of aircraft of the specific model.

Preferably, the flight planning system includes an output interface for outputting the flight plan, the ATC flight plan and the dispatch release. In various embodiments, the output interface includes a printer for printing the flight plan, the ATC flight plan and the dispatch release and/or a transmitter for transmitting the flight plan, the ATC flight plan and the dispatch release to the relevant OCC or dispatch office. The ATC flight plan may also be transmitted directly to the relevant aviation authority for obtaining a flight clearance In some embodiments, the flight planning system includes a plurality of the flight management systems, with each flight management system being for a respective aircraft set. An "aircraft set" could have a single member (a specific aircraft) or several members (e.g. all aircraft of a specific model).

Preferably, constructing the flight plan includes computing a value of a point of no return (PNR), if applicable, and/or a value of a point of equal time (PET) and/or a value of an extended twin-engine operations requirement (ETOPS), if applicable, and/or a value of a long range operations requirement (LROPS), if applicable.

Preferably, the flight planning system also includes an input interface for providing the flight plan manager with dynamic information. "Dynamic" information is defined herein as information that changes from flight to flight, for example, the identities of departure and destination airports, but the flight plan itself is excluded from this definition of "dynamic information". In various embodiments, the input interface includes a manual user interface and/or a receiver for wireless reception of at least a portion of the dynamic information. Examples of dynamic information that could be received by the receiver include weather reports at the departure and destination airports.

The scope of the present invention also includes an aircraft that includes a flight planning system of the present invention.

A basic flight management system of the present invention includes a flight plan manager for constructing a flight plan in accordance with information stored within the flight management system. The "constructing" of the flight plan is as opposed to merely presenting or displaying a flight plan that has been stored previously in the flight management system.

Preferably, the flight management system includes an output interface for outputting the flight plan. In various embodiments, the output interface includes a printer for printing the flight plan, the ATC flight plan and the dispatch release and/or a transmitter for transmitting the flight plan, the ATC flight plan and the dispatch release to the relevant OCC or dispatch office. The ATC flight plan may also be transmitted directly to the relevant aviation authority for obtaining a flight clearance.

A first basic method of producing a flight plan, for a flight, includes two steps. In the first step, dynamic information (other than a flight plan) related to the flight is provided to a flight management system. In the second step, the flight management system computes respective values of one or more parameters of the flight plan, based at least in part on the dynamic information. Exemplary parameters include a point of no return, a point of equal time, an extended twin-engine operations requirement and a long range operations requirement.

Preferably, the flight management system outputs the flight plan, e.g. by printing the flight plan or by transmitting the flight plan to an aviation authority.

A second basic method of producing a flight plan, for an aircraft, includes three steps. In the first step, a flight plan manager is operationally coupled to a plurality of flight management system, with each flight management system being for a different respective aircraft set. An "aircraft set" could have a single member (a specific aircraft) or several members (e.g. all aircraft of a specific model). In the second step, the flight plan manager selects the flight manager system whose respective aircraft set includes the aircraft for which the flight plan is to be produced. In the third step, the flight plan manager produces the flight plan in accordance with information obtained by the flight plan manager from the selected flight management system.

Preferably, the second method also includes the step of providing an identifier, such as an aircraft registration, of the aircraft for which the flight plan is to be produced. The flight plan manager then selects the appropriate flight management system in accordance with the identifier. An "aircraft registration" is a unique alphanumeric string that identifies the aircraft.

A third basic method of producing a flight plan, for an aircraft, includes three steps. In the first step, a shared front end is operationally coupled to a plurality of flight planning system, with each flight planning system being for a different respective aircraft set. An "aircraft set" could have a single member (a specific aircraft) or several members (e.g. all aircraft of a specific model). In the second step, the shared front end selects the flight planning system whose respective aircraft set includes the aircraft for which the flight plan is to be produced. In the third step, a flight plan manager of the selected flight planning system produces the flight plan.

Preferably, the third method also includes the step of providing an identifier, such as an aircraft registration, of the aircraft for which the flight plan is to be produced. The shared front end then selects the appropriate flight management system in accordance with the identifier.

BRIEF DESCRIPTION OF THE DRAWINGS

Various embodiments are herein described, by way of example only, with reference to the accompanying drawings, wherein:

FIGS. 3 and 4 show a portions of printouts of an exemplary flight plans;

DESCRIPTION OF THE PREFERRED EMBODIMENTS

Figure 1:
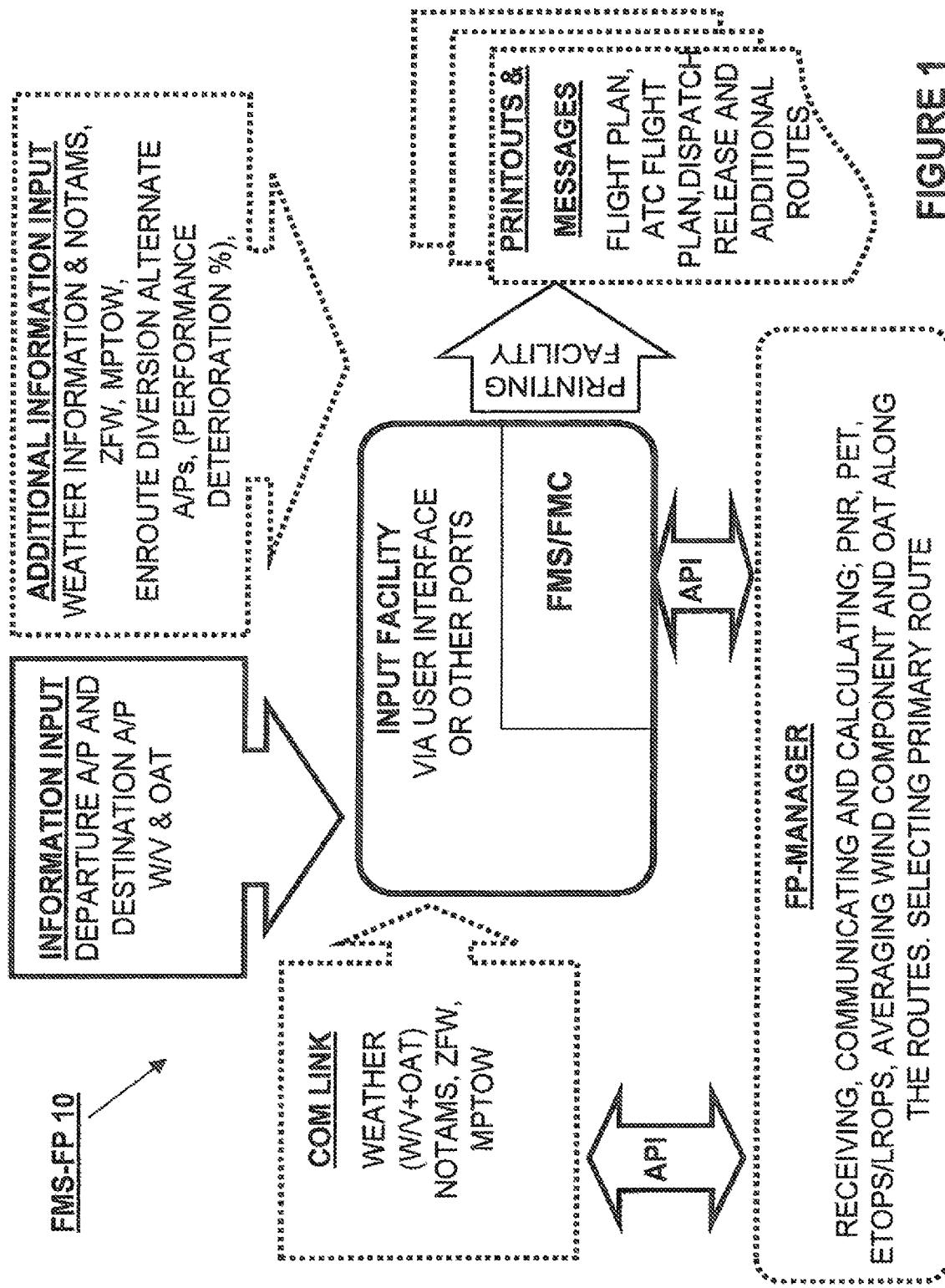
FIG. 1 is a schematic functional illustration of a FMS-FP system for use on board an aircraft.

The principles and operation of flight plan generation according to the present invention may be better understood with reference to the drawings and the accompanying description.

In the following detailed description, numerous specific details are set forth in order to provide a thorough understanding of the disclosure. However, it will be understood by those skilled in the art that the present invention may be practiced without these specific details. In other instances, well-known methods, procedures, components and circuits have not been described in detail, so as not to obscure the present disclosure.

In order to facilitate the description herein, the following terms are defined:

As mentioned above, the term "flight plan" (FP) refers herein as the detailed flight plan resulting from a "flight planning process".

The term "flight management system" (FMS) refers in the art to a computerized avionics component for assisting a pilot in performing activities, decisions and so on, with regard to a flight.

The term "FMS based facility" or "FMS/FMC" refers herein to a system that makes use of an FMS or components of an FMS, such as an FMC, or any other device performing similar functions (e.g., FMGS).

The term "FMS-FP" refers herein to an FMS/FMC based facility adapted for producing flight plans.

As mentioned above, producing a flight plan involves two safety-critical aspects: (a) fuel calculation; and (b) compliance with air traffic control requirements. A typical flight management system of the prior art provides both fuel calculations and compliance with air traffic requirements.

The basic purpose of a flight planning system is to calculate the quantity of the "trip fuel" required by an aircraft when flying from the departure airport to the destination airport. Furthermore, in order to indicate that an aircraft is performing as expected by the manufacturer, a pilot may compare the actual remaining fuel with the planned remaining fuel at any point of the flight plan. An aircraft must also carry reserve fuel (as dictated by air traffic regulations and aviation authorities), to allow for unforeseen eventualities, such as adverse weather conditions, an inaccurate weather forecast, instructions from air traffic control to fly at other than planned altitudes/flight levels due to air traffic congestions, or an aircraft weight different from that upon which the flight plan was calculated (e.g. some last-minute change in aircraft weight due to changes in the load carried). In the case of last minute change, if required, a new flight plan may be issued in a very short time period using the aircraft based or ground based 'FMS-FP' system of the present invention.

A flight plan, in most cases, specifies an "alternate airport" in addition to a destination airport. The alternate airport is for use in case the destination airport becomes unusable while the flight is in progress (due to weather conditions, a strike, a crash, etc.). In some cases the destination airport may be so remote that there is no feasible alternate airport; in such a situation the regulations stipulate additional fuel quantity uplift enough to circle in the vicinity of the destination airport for a predetermined time (e.g. 2 hours, expecting the airport to become available within that time). In this case weather conditions at the destination airport, in accordance with the regulations, should be better than under normal situations where an alternate airport does exist.

There is often more than one possible route between two airports. Subject to safety requirements, aircraft operators generally wish to minimize costs by selecting the best route, speed, and Altitude/Flight Level.

A conventional FMS usually includes four major components: [0125] FMC (flight management computer); [0126] AFS (auto flight system); [0127] a navigation system including IRS (Inertial Reference System) and GPS; and [0128] EFIS (electronic flight instrument system).

The primary functions of the flight management computer, FMC, include:

Giving out real-time lateral navigation information by showing the route programmed by the pilots, as well as other pertinent information from the FMS database, such as standard departure and arrival procedures. This information combined with the location of the aircraft is used to create a moving map display.

Calculating performance data and predicted vertical profile. Based on the weight of the aircraft, cost index and cruise altitude, preferably with predicted winds, the FMC calculates a most fuel efficient vertical path that AFS would follow if AFS is engaged and both of VNAV and LNAV are engaged.

Auto flight system: If FMC is taken as the "head" of the system which does the calculation and gives out command, AFS is the system who accomplishes it. AFS includes AFDS (A/P-autopilot-F/D-(flight director) and A/T (autothrottle) if the aircraft is equipped with A/T. AFDS flies the aircraft with one "hand" on the control wheel (when A/P is engaged), and the other "hand" on the throttle (when A/T is engaged). Only when the mode "LNAV and VNAV", or LNAV, or VNAV is engaged, AFS totally or partially follows the flight path FMC commands.

Navigation system. It includes mainly IRS (Inertial Reference System) or AHRS (Attitude Heading and Reference System) and GPS (Global Positioning System), as well as existing physical Navaids such as VOR-DME. OPS is so far the most precise system for locating the aircraft's position. What IRS and AHRS can do and UPS cannot do is that IRS gives out raw information that are crucial to flight such as attitude and heading of the aircraft. The navigation system sends navigation information to the FMC to calculate, and to AFS to control the aircraft, and to EFIS system to display. Little action is needed from the pilots during most phases of flight (other than monitoring the information displayed, maintaining continuous radio contact, and, when required, feeding new information into the FMS).

EFIS as a display system displays flight information including commands from FMC and real-time information such as attitude/flight level, heading, position, planned route and flight track, etc. EFIS includes EADI (Electronic Attitude Display Indicator) and EHSI (Electronic Horizontal Status Indicator), or on some aircraft PFD (Primary Flight Display) and ND (Navigation Display). Either of these displays lateral or vertical flight information.

One example of a conventional FMS/FMC is the Rockwell Collins FMS-6000, produced by Rockwell Collins, Cedar Rapids Iowa USA. Such conventional FMS/FMCs are capable of receiving, storing and using flight plans prepared elsewhere but not of preparing their own flight plans to be used by the pilots during the flight.

The core of producing a flight plan is calculating the "times" (leg & accumulated times) and the corresponding fuel consumption (leg & accumulated fuel used and required fuel reserve) along a certain route and cruise altitude/FL. These calculations are made in accordance with the aircraft characteristics, aircraft weight and cost index under predicted weather conditions, such as W/V and OAT. The Appendix details some calculations involved in producing a flight plan.

Presently, flight plans are produced by ground stations that employ computers that have been designed especially for producing flight plans.

According to the present invention, the aviation-related calculations ability of an FMS/FMC is employed for producing a Flight Plan. Information related to the aircraft characteristics, such as fuel consumption, speed and other performance capabilities, and so forth, is actually stored within data storage of FMS/FMC systems of an aircraft. Additional information, such as Routes, SIDs, STARs etc., is available within the FMS/FMC of an aircraft and supplied by authorized publishers (e.g. governments or privately owned suppliers), and so forth.

Authorized (by aviation authorities) weather data suppliers, regularly supply the required weather data required to produce a flight plan. These data are fed into the FMS-FP system. Thus, the ability to perform the major calculations involved in producing a flight plan is already embedded in an FMS/FMC. As such, as discovered by the inventors of the present invention, many conventional flight management systems include both most of the required information and the computational capability to produce a flight plan.

Because the ability to perform the calculations required to produce a flight plan are already embedded in most FMS/FMCs, in order to produce a flight plan, according to the present invention an FMS/FMC is adapted for the additional object of producing a flight plan. For example, the needed modifications may include adding an FP-manager for managing and manipulating the process of producing the flight plan. Such an FP-manager may be, for example, a software module, embedded in or interacting with an FMS/FMC, that retrieves the required data from an FMS/FMC, invokes the required functions of the FMS/FMC, and instructs the FMS/FMC to display and print out the produced flight plan.

One class of embodiments of an FP-manager is an application program and its API (Application Program Interface) as an add-on to a FMS/FMC based facility. The manufacturer of an FMS/FMC based facility provides software/hardware facilities through which such an application program may interact with the functions of the FMS/FMC based facility. A designer of an FMS-FP may instruct the FMS/FMC based facility to carry out the required calculations through the API.

According to one embodiment of the present invention, an FMS-FP is installed on an aircraft in order to be used while the aircraft is on the ground, to produce a Flight Plan.

According to another embodiment of the present invention, an FMS-FP is installed in a ground station to produce a Flight Plan.

In addition to being used on the ground before takeoff, an FMS-FP on board an aircraft may be adapted to be used during flight, e.g. when a new flight plan is to be filed before the next flight sector, after landing.

The components of an FMS-FP may be entirely embedded in an FMS/FMC based facility, or may include components external to the FMS/FMC based facility.

An FMS-FP of the present invention has several advantages, as follows.

Reliability: As an FMS/FMC has been well-tested before release and verified during flight, it is a very reliable facility. As such, employing an FMS/FMC in an FMS-FP results in a very high reliability product.

Higher security level: An FMS-FP installed on a specific aircraft embeds in its database information unique to the aircraft the FMS-FP is installed in. Because a user does not have to provide to an FMS-FP installed in an aircraft the specific parameters of this aircraft, an FMS-FP installed in an aircraft is less vulnerable to human errors.

In a ground installation, reducing the vulnerability to human errors is achieved by linking the input of the aircraft registration (or tail number) with the associated FMS/FMC.

Minimizing fuel consumption: Carrying extra fuel results in increased cost. Because an aircraft operator regularly updates the parameters of a specific aircraft (such as the fuel consumption of the specific aircraft due e.g. to deterioration in aircraft performance), the calculated fuel consumption thereof is quite accurate, and therefore the aircraft does not have to be fueled with extra fuel that is not required for the specific Flight Plan. Furthermore, in the case that the extra fuel consumption is not taken into account while planning the flight, an additional regulatory fuel quantity (e.g. 5%) should be added to the estimated fuel consumption.

Thus, using an FMS-FP results in reducing aircraft weight by carrying less fuel and thus reducing the cost of the flights by consuming less fuel without jeopardizing the safety of the flight.

Independence of the FMS-FP: Having the ability to produce a Flight Plan without being dependent on external suppliers, when communication facilities are restricted or not available, such as in disaster or in time of war.

Simplicity: Although the input information for producing a Flight Plan is complicated even for a skilled person, the input the user has to provide to an FMS-FP is quite simple, and as such it is less vulnerable to human error.

Minimum human involvement: As mentioned above, if the ground station Flight Plan supplier mistakenly calculates a Flight Plan for a Boeing 737 instead of a Boeing 767, it may end in an air disaster. However, according to the present invention FMS-FP installed on an aircraft or on the ground already uses the correct parameters with regard to the aircraft and route, and therefore the likelihood of such errors occurring becomes insignificant.

Flexibility: An operator may define the output according to his preferences, and as such he gets used to a certain format, thereby noticing exceptions more easily.

Adapting an FMS/FMC to produce a Flight Plan requires some changes, notably for inputting information, outputting the Flight Plan, the ATC flight plan and Dispatch release, coordinating between the modules of the system such as the input, output, storage, and computational modules. The module that manipulates the production of an FMS-FP is referred herein as "FP-manager". The module may be based on computer components, such as software, firmware and/or hardware.

An FMS-FP also may be adapted to perform calculations which may be required for producing a Flight Plan, but that are not required for the conventional functionality of an FMS/FMC. For example, calculations of the PNR, PET or ETOPS/LROPS are not required in the conventional functionality of an FMS/FMC, but are required for producing a Flight Plan.

According to the preferred embodiments of the present invention, the following data entities may be used for producing a Flight Plan: [0159] Departure airport: May be provided by menu selection or manual insertion. [0160] Take-Off [T/O] Runway [RWY]: May be provided by automatic insertion using the communication system (e.g. insertion from ATIS), menu selection or manual insertion. [0161] Weather reports for the departure airport: May be provided by ATIS, transmission from a data supplier or manual insertion. This information is required for determining whether a T/O alternate airport is required. The FMS-FP may also maintain a list of T/O alternate airports. [0162] MPTOW [Maximum Permissible Take Off Weight] May be derived from a computerized T/O performance system and may be automatically inserted into the FMS-FP for the Flight Plan calculation. The MPTOW may be manually extracted from pre-computed tables which are supplied usually by the aircraft manufacturer. In very rare occasions, the MPTOW is calculated using graphs of the aircraft Operations Manual [OM] or the Aircraft Flight Manual [AFM]. In case automatic insertion of the MPTOW into an FMS-FP is not possible, this information must be inserted manually. [0163] ZFW [Zero Fuel Weight]: May be inserted automatically through the operations control center [OCC] of an operator or inserted manually. [0164] Must ride items [MR]: Items that are part of the load on the aircraft that must be carried and will not be off-loaded in case the carriage of load is limited (e.g. long flights that require a large amount of fuel and carrying all the load will result in exceeding the MPTOW or insufficient fuel to perform the flight legally). [0165] Last Minute Change [LMC] of load (e.g. flight cancellation by some passengers or extra load to be carried). [0166] Destination airport: May be provided by automatic insertion using the flight schedule, menu selection or manual insertion. The destination airport data base should include a list of approved alternate airports in accordance with the preference of the operator or any other information regarded by the operator as essential. In case, for any reason, the selection of the alternate airport cannot be done automatically, a manual insertion capability is provided.

The weather reports for destination airport is automatically received and analyzed to determine which landing category is in effect. [0168] Applicable routes of the Organized Track System [OTS] over the North Atlantic Ocean [NAT] (if applicable). Automatic insertion (via the communication system through the OCC) or manual insertion. [0169] En-route diversion alternate airports: May be provided by automatic insertion from the data base and related to the specific route, by menu selection or by manual insertion.

The weather reports for these airports are automatically received and analyzed to determine whether these airports are suitable as diversion alternates. [0171] Weather [WX] input: [0172] At the departure airport: A detailed WX report is used to determine whether a T/O alternate airport is required. [0173] Along the route at the appropriate levels:- W/V and OAT and hazardous WX phenomena (e.g. moderate [MOD] to severe [SEV] turbulence, MOD to SEV icing). [0174] En-route alternate airports: WX reports must be fed for these airports to automatically determine the suitability of these airports as diversion alternate airports and thus enable the automatic calculation of PET, ETOPS/LROPS and PNR (if applicable).

The assessment of whether these airports are suitable may be done manually and afterwards inserted as 'suitable airports' for the applicable calculation (e.g. calculation of PET, ETOPS/LROPS and PNR (if applicable)).

The selection of the suitable PET and ETOPS/LROPS airports is made in accordance with regulatory requirements and operator's policy. A computer program may be added to calculate the above and inserted in the Flight Plan including times and fuel used to the selected PET airports. The required fuel to the PET airport as calculated above may sometimes dictate an extra fuel upload to abide by the regulations. The PNR, if required, is calculated in a similar manner Other relevant parameters are listed in FIGS. 1 and 2 as described below. [0177] At the destination airport: A detailed report used for determining whether the airport is 'open' or 'closed' for landing at the estimated time of arrival in accordance with the regulations. [0178] At the destination alternate airport: To determine the most suitable alternate airport.

Although the entire input information to an FMS-FP is fairly complicated even to a skilled person, normally an operator has to provide only the following information: [0180] Departure airport, and optionally the take-off runway; [0181] destination airport; and [0182] selection of a route from a list of routes.

When using an FMS-FP in a ground station, the user has also to input the aircraft registration and so the appropriate specific aircraft required details are selected. This may also be carried out by menu selection or by manual insertion.

Operators usually use the same routes for their flights. For example, for a JFK-TLV flight there may be a few routes, such as JFK-TLV-1, JFK-TLV-2, JFK-TLV-3, and JFK-TLV-4, etc. from which a user may select one of the routes. Each route may be planned in advance according to the preferences of the operator. The most suitable of these routes may be selected in accordance with the operator's policy.

The following are examples of information that can be outputted from an FMS-FP, according to preferred embodiments of the present invention. A user (pilot, aircrew, dispatcher, etc.) may adapt the output to comply with regulations thereof. [0186] Summary of the printed flight plan (e.g. ZFW, econ. index, flight time, accumulated ground distance, accumulated air distance [NAM], FOB, trip fuel, total fuel reserve etc.). Part of this information is not a mandatory part of a flight plan, but is requested by most operators. It varies from operator to operator. [0187] Basis and validity of flight plan (e.g. time of issue, estimated time of departure [ETD], validity time of the flight plan in accordance with the regulations, aircraft F/F deviation in % from the 'book' due to performance deterioration, etc.). Part of this information is not a mandatory part of a flight plan but is requested by most operators and varies from operator to operator. [0188] Detailed flight plan. The format of the printed flight plan differs from operator to operator but includes similar details. Generally a detailed flight plan includes the detailed SID, the detailed route, the detailed STAR, the detailed flight plan to the alternate airport, PET calculations between the selected diversion airports, PNR calculations if applicable, the detailed break-down of the total fuel reserves, and aircraft weight limits compared to the actual aircraft weights. [0189] Secondary routes analysis. Most operators require such information in case that the originally requested route is for some unforeseen reason not available. A secondary route analysis should include the route description and a summary of the total time, fuel burn-off at the optimum altitudes and the total distance (ground and air distances). [0190] ATC flight plan It is required by the regulations to file a request for the flight through the ATC. Some of the information required to fill in such a request is extracted from the Hight Plan itself (e.g. detailed route information, times calculated for predetermined points along the route such as FIR crossing etc.). Other information is related to the aircraft and is available and extracted from a data base (e.g. aircraft registration, SELCAL (selective call), description of the emergency equipment, the radio and navigation equipment etc.). [0192] Dispatch release form is to be filled before each flight and must include all the relevant information as required by the regulations However, the layout of this form may differ from operator to operator and indicates that all the calculations for dispatching the flight were made and are satisfactory and do not deviate from the requirements as dictated by the regulations. It must be signed by the dispatcher and countersigned by the pilot in command [PIC]

As mentioned above, the format of the printed Flight Plan differs from operator to operator and may include additional output information, i.e., information that is not required to be filled in a basic flight plan (that must have all calculations concerning 'time' and 'fuel' at the planned ALT/FL.

The contents of such additional output information is usually dictated by the chief pilot. This information is usually inserted in the proper location on the flight plan form so that it is most useful.

The additional information may include the following: [0196] Minimum safe altitude [MSA] for each leg (a section of the flight between two waypoints). [0197] W/V. [0198] OAT.

W/V and the wind component during climb and descent at pre-selected ALT/FL's. [0200] W/V and OAT en-route above and below the cruising ALT/FL to aid the pilot in deciding whether to climb or descend. [0201] Distance traveled over each control (used for calculation of the fees for over-flying rights). [0202] any other relevant information.

Referring now to the drawings, FIG. 1 schematically illustrates an FMS-FP system 10 intended to be installed in an aircraft, according to a preferred embodiment of the present invention. FMS-FP system 10 is for use on an aircraft by a pilot of the aircraft or by a dispatcher as a part of flight preparations, issuing the flight plan, the ATC Flight Plan and the Dispatch release (if required).

As described above, FMS-FP system 10 includes (a) a computational ability to produce a flight plan, and (b) the majority of the information required for producing a flight plan (such as routes, aircraft characteristics and performance) is already available to FMS/FMC. Thus, in order to employ an FMS/FMC for producing a flight plan, missing information (such as departure and destination airports, predicted W/V and OAT) should be provided to the FMS/FMC. As a result, a conventional FMS/FMC system requires modifications in order to operate as an FMS-FP system.

In FIG. 1 the functional blocks relating to the components that have to be added to an FMS/FMC in order to operate as FMS-FP system 10 are marked in dashed lines.

Because the information regarding the departure airport, destination airport and routes may be stored in the FMS/FMC, a user may only need to select the required parameters and calculate some flight plans along the available practical routes between the airport of departure and airport of destination and select the most favorable flight plan through an interface and an adapted program. The required information that is not stored in the FMS/FMC (e.g. W/V and OAT) may be inputted to FMS-FP system 10 "automatically" or "manually".

In addition to the modifications for inputting information, the FMS/FMC is adapted to render the calculations required for producing a flight plan. However, because the core of an FMS/FMC already includes the computational ability to produce a flight plan, the required modifications are in the level of activating existing software components supplemented by additional software programs (e.g. for calculating the PET, ETOPS/LROPS and PNR (if applicable) and passing the parameter values thereof among the software modules).

The user interface of FMS-FP system 10 may also be implemented on a laptop computer which may be connected to an FMS/FMC system by wired or wireless communication means. Furthermore, instructions and/or input data for producing a flight plan may be provided to FMS-FP system 10 by removable data storage means, such as a USB drive (a portable storage device connects to a system by USB interface), CD-ROM, and so on.

A flight plan is constructed before the departure of a flight. Weather information and other information required for the calculation of a Flight Plan is available to FMS-FP system 10 using communication facilities, and may be provided or available to FMS-FP system 10 "automatically" or inserted "manually".

Figure 2:
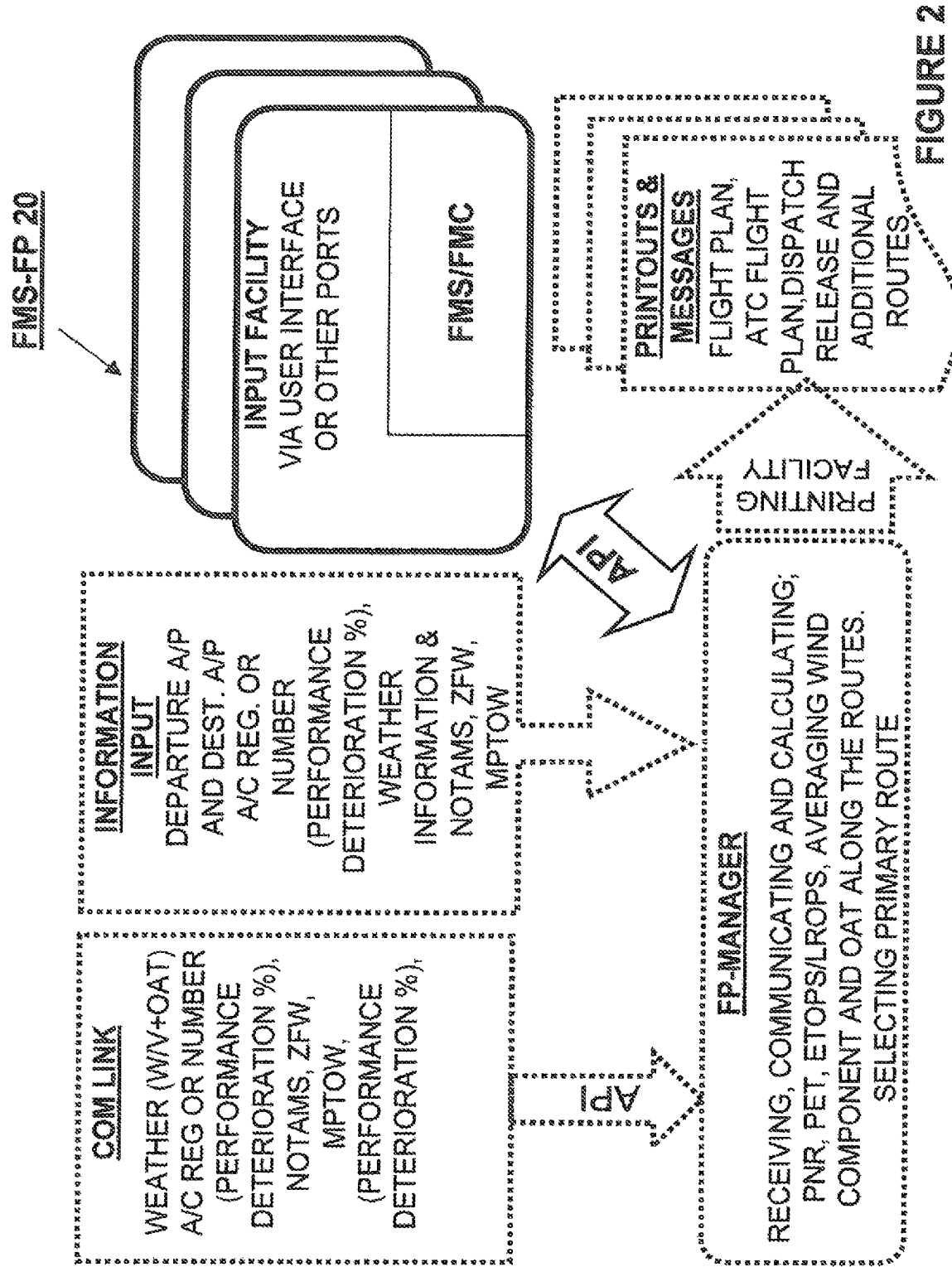
FIG. 2 is a schematic functional illustration of a FMS-FP system for use in a ground station.

FIG. 2 schematically illustrates an FMS-FP system 20 intended to be installed in a ground station, according to one embodiment of the present invention.

As in FIG. 1, in FIG. 2 the functional blocks indicating the components that have to be added to an FMS/FMC system in order to operate as FMS-FP system 20 are marked in dashed lines.

The major difference between FMS-FP system 10 that is intended to be installed in an aircraft and FMS-FP system 20 that is intended to be installed in a ground station is that FMS-FP system 20 is to be provided with the FMC of all relevant aircraft operated through that specific ground installation. The appropriate FMC is selected automatically by inserting the aircraft registration. The aircraft registration is inserted automatically, by menu selection or manually.

The data required to construct a flight plan may be fed into FMS-FP system 20, for example, via the Internet. Thus, a simple configuration of the communication may be via a laptop that gets the information e.g. from a weather forecasting web site, and provides the information to FMS-FP system 20 by a wired connection, such as USB (Universal Serial Bus) or by wireless connection.

FMS-FP system 10 or 20 may obtain weather-related information from meteorological institutes. Such information may be provided, for example, in the GRIB format, which is used by meteorological institutes over the world to transport and manipulate weather data.

FMS-FP system 20 operated in a ground station may be designed to use a plurality of FMS-FP modules, each one associated with a different aircraft or aircraft model. Such a design may include a plurality of FMS-FP cards (e.g., integrated circuits), each card for a different aircraft or for a different aircraft model, a separate user interface facility for each FMS-FP card, a combined user interface facility for all the FMS-FP cards, and so on. Each FMS-FP card (module and so forth) may use its own FMS/FMC.

FIG. 3 illustrates a portion of a printout of an exemplary flight plan sample produced by an FMS-FP installed in an aircraft or ground station, according to embodiments of the present invention. Different operators might prefer other layouts for their flight plans.

FIG. 4 illustrates a portion of an additional exemplary printout format of a flight plan produced by an FMS-FP installed in an aircraft or ground station, according to embodiments of the present invention. Again, different operators might prefer other layouts for their flight plans.

To minimize human error it is most preferable that, on a flight plan produced by a ground based FMS-FP system, the aircraft type and aircraft registration are marked prominently at the top of the page (both on the FMS-FP display screen and on the printed page).

Figure 5:
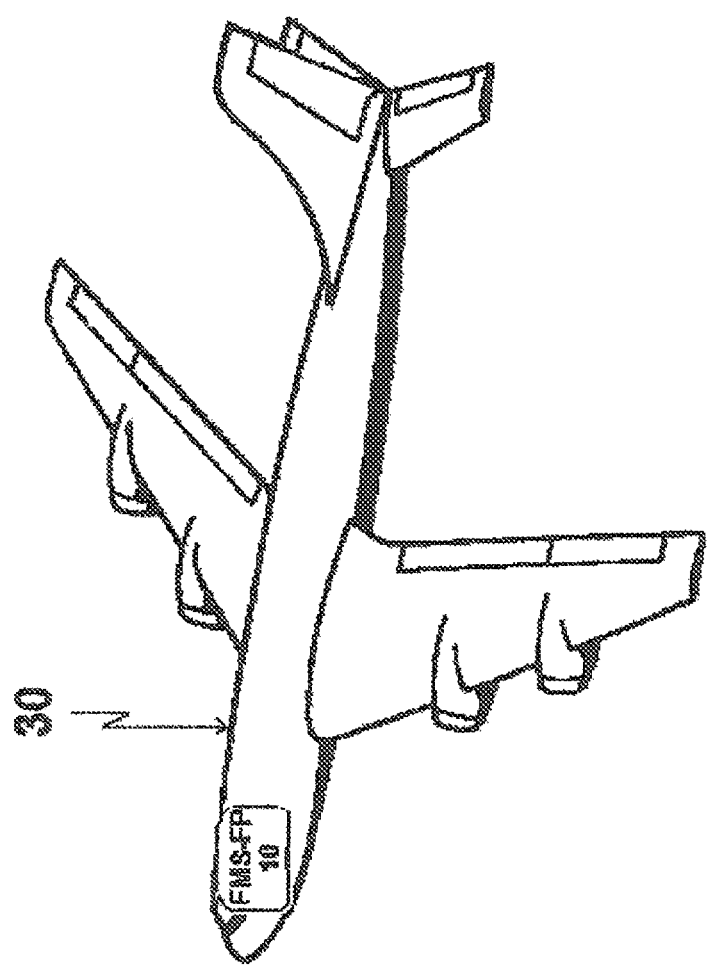
FIG. 5 shows, schematically, an aircraft that has the FMS-FP system of FIG. 1 on board.

FIG. 5 shows, schematically, an aircraft 30 having FMS-FP system 10 on board.

Figure 6:
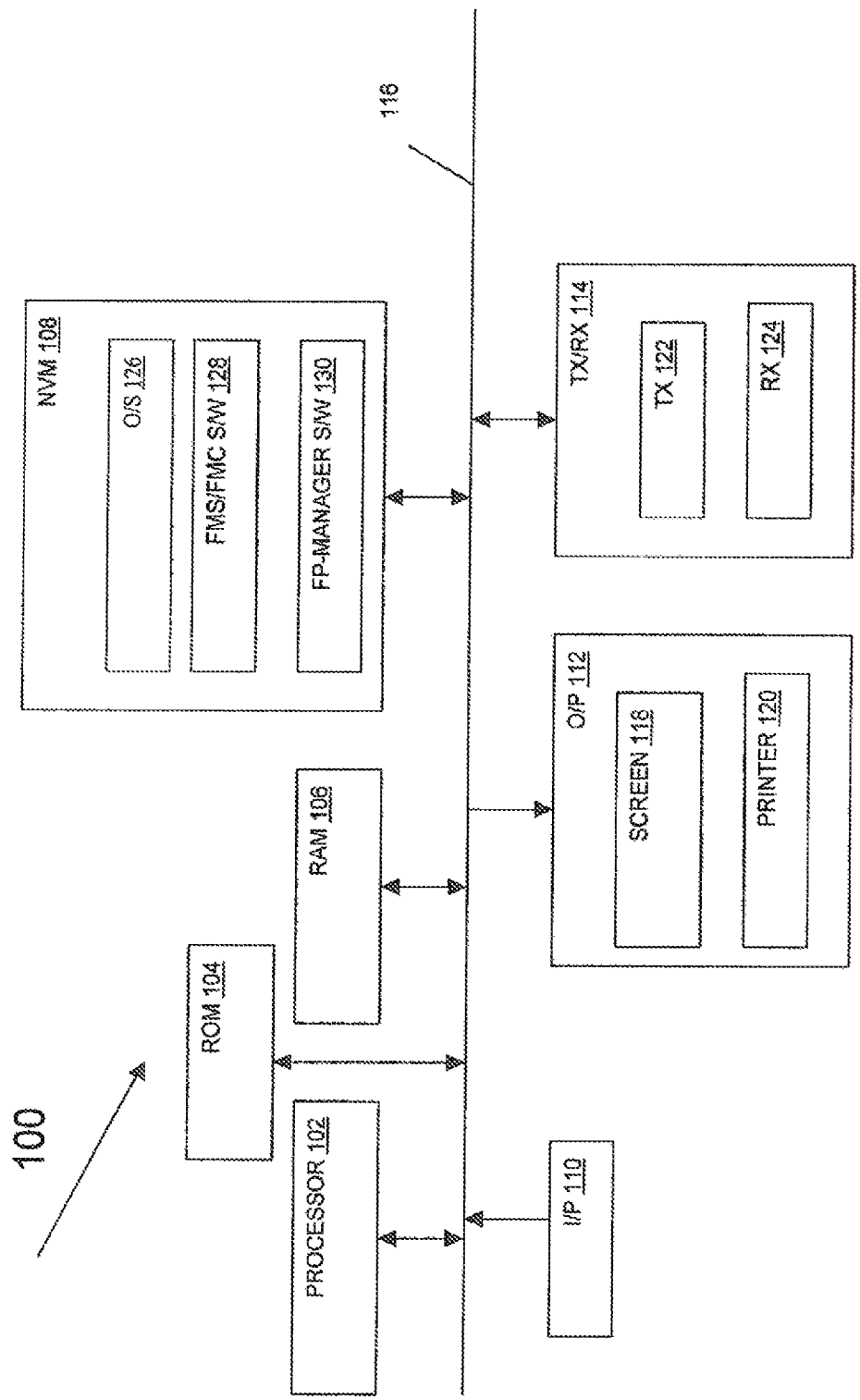
FIG. 6 is a partial schematic block diagram of a FMS-FP system for use on board an aircraft.
Figure 7:
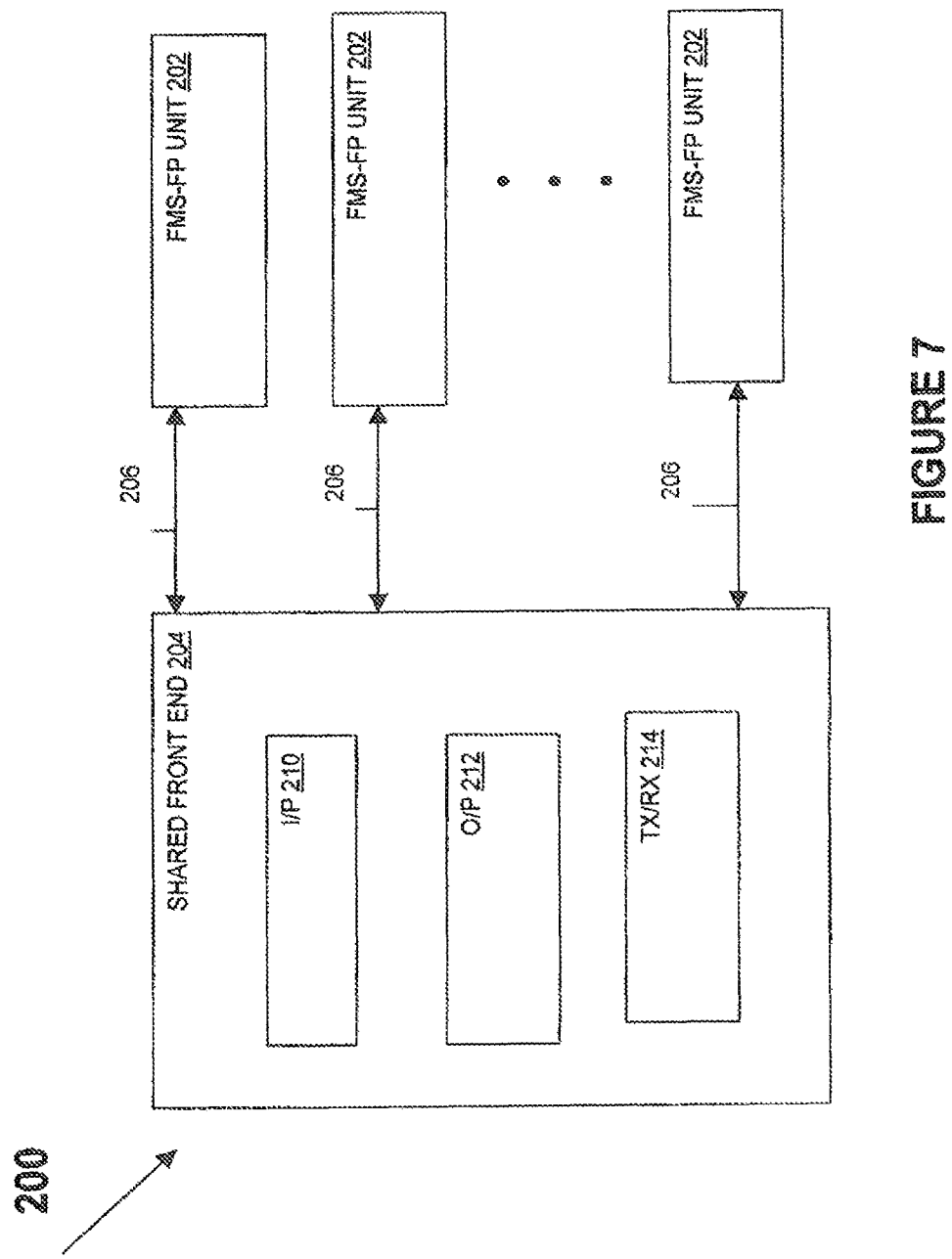
FIGS. 7 and 8 are partial schematic block diagrams of FMS-FP systems for use in ground stations.
Figure 8:
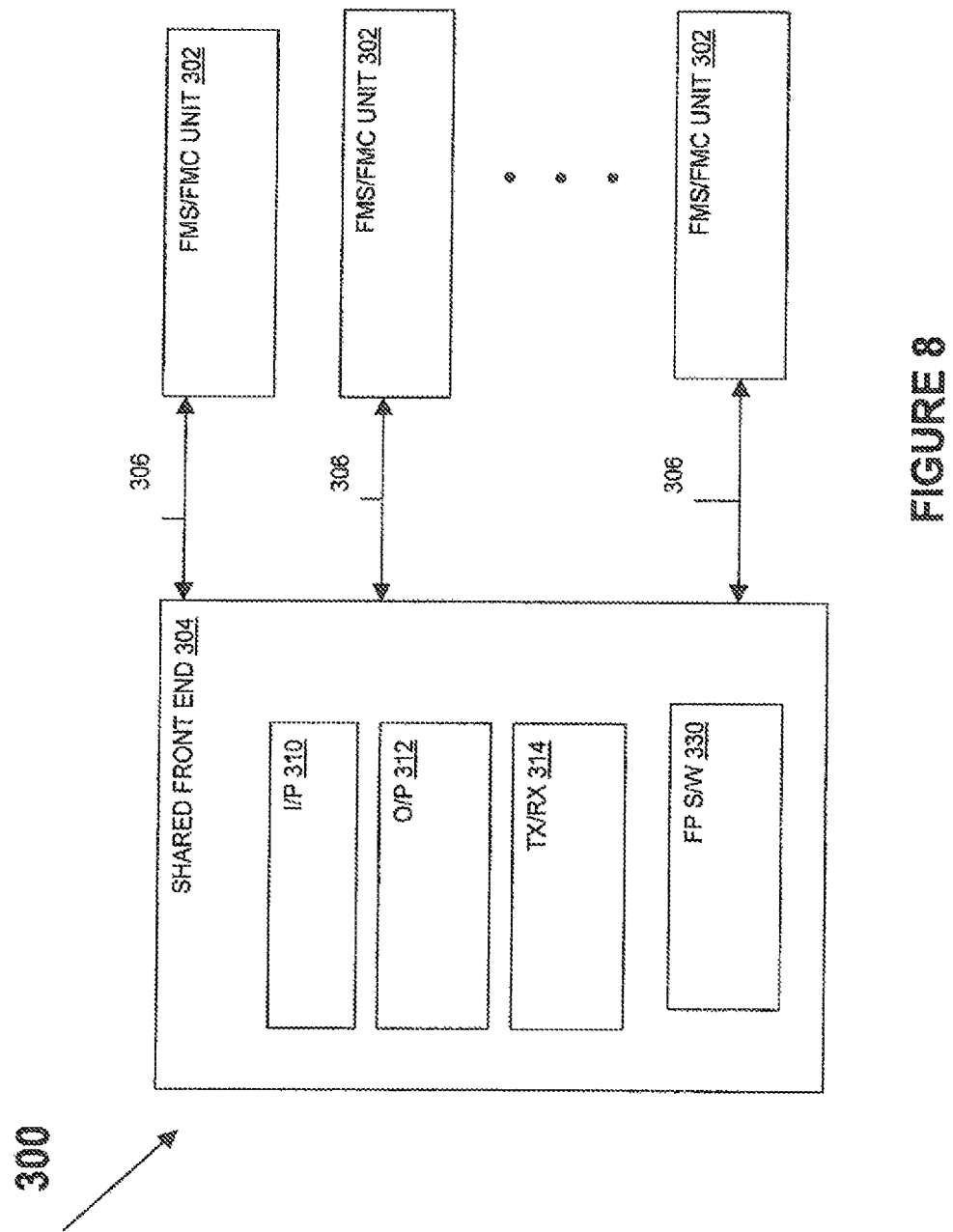

FIGS. 1 and 2 above are functional illustrations of exemplary embodiments of FMS-FP systems according to the present invention. FIGS. 6-8 are schematic block diagrams that illustrate the physical components of such systems.

FIG. 6 is a partial schematic block diagram of a conventional FMS/FMC based facility as modified in accordance with the present invention to be a FMS-FP system 100 of the present invention for use on board an aircraft. FMS-FP system 100 includes a processor 102, a read-only memory 104, a random access memory 106, a non-volatile memory 108 such as a hard disk or a flash disk, a user input block 110, a user output block 112 and a transceiver 114, all communicating with each other via a bus 116. User input block 110 includes conventional input mechanisms such as a keyboard, a touch screen, a mouse and/or a CD reader. User output block 112 includes conventional output mechanisms such as a display screen 118 and a printer 120. Transceiver block 114 includes a transmitter 122 and a receiver 124 for wireless communication.

In non-volatile memory 108 are stored an operating system 126, conventional FMS/FMC software 128 and FP-manager software 130. When FMS-FP system 100 is powered up, processor 102 executes boot code stored in read-only memory 104 to load operating system 126 into random access memory 106. Subsequent operation of FMS-FP system 100 is by execution of operating system 126 in random access memory 106 by processor 102. Operating system 126 loads, as needed, modules of FMS/FMC software 128 into random access memory 106 for execution by processor 102. In executing FMS/FMC software 128, FMS-FP system 100 operates as a conventional FMS/FMC based facility. In addition, under user control, operating system 126 loads, as needed, modules of FP-manager software 130 into random access memory 106 for execution by processor 102 to produce a flight plan as described above. The flight plan, ATC flight plan and Dispatch release so produced are printed on printer 120 and/or transmitted to the relevant OCC or Dispatch office by transmitter 122. The ATC flight plan may also be transmitted to the relevant aviation authority for obtaining a flight clearance.

FIG. 7 is a schematic block diagram of a FMS-FP system 200 for use in a ground station. FMS-FP system 200 includes several FMS-FP units 202 that are identical to FMS-FP system 100 as illustrated in FIG. 6 from bus 116 upwards. In other words, FMS-FP units 202 lack their own user input blocks, their own user output blocks and their own transceivers. Each FMS-FP unit 202 is for a respective aircraft or for a respective aircraft model. Three FMS-FP units 202 are shown in FIG. 7, but FMS-FP system 200 could include any desired number of FMS-FP units 202. The missing input and output facilities of FMS-FP units 202 are provided by a shared front end 204 to which FMS-FP units 202 are operationally coupled by data links 206. For example, FMS-FP units 202 could be blades coupled to shared front end 204 via a network bus. Alternatively, data links 206 could be wired connections such as USB connections. Alternatively, FMS-FP units 202 could communicate with shared front end 204 according to a short-range wireless protocol such as Bluetooth.™. Shared front end 204 includes a user input block 210 that is similar to user input block 110, a user output block 212 that is similar to output user block 112, and a transceiver 214 that is similar to transceiver 114. A user of FMS-FP system 200 uses user input block 210 to provide an identifier, such as a registration number, of the aircraft for which a flight plan is to be prepared. Shared front end 204 selects the appropriate FMS-FP unit 202 to produce the flight plan for that aircraft. The flight plan, ATC flight plan and Dispatch release so produced are printed by the printer of user output block 214 and/or are transmitted to the appropriate recipients by transceiver 216.

FIG. 8 is a schematic block diagram of another FMS-FP system 300 for use in a ground station. FMS-FP system 300 includes several FMS/FMC units 302 that are identical to FMS-FP units 202 except for lacking EP-manager software 130. In other words, FMS/FMC units 302 are conventional FMS/FMC units. The flight planning functionality of FMS-FP system 300 is provided by FP-manager software 330 in a shared front end 304 that otherwise is identical to shared front end 204 and that has its own user input block 310, user output block 312 and transceiver 314. FMS/FMC units 302 are operationally coupled to shared front end 304 by data links 306 that are similar to data links 206. A user of FMS-FP system 300 uses user input block 310 to provide an identifier of the aircraft for which a flight plan is to be prepared. Shared front end 304 selects the appropriate FMS/FMC unit 302 to use for producing the flight plan for that aircraft and then produces that flight plan by using the appropriate facilities of the selected FMS/FMC unit 302 while executing FP-manager software 330 to provide the missing functionality of the selected FMS/FMC unit 302 as described above.

While the invention has been described with respect to a limited number of embodiments, it will be appreciated that many variations, modifications and other applications of the invention may be made. Therefore, the claimed invention as recited in the claims that follow is not limited to the embodiments described herein.

APPENDIX

Producing a Flight Plan

Aircraft Weights Associated with a Flight:

Payload is the total weight of the passengers, luggage, cargo and mail in a flight.

Dry Operating Weight (DOW) is the operational empty weight of an aircraft and includes all fixed equipment, all system fluids, unusable fuel, seats and fixtures, galley structure, emergency equipment, blankets and pillows the weight of the crew members with their luggage, galley equipment & stores and passenger service items.

Zero Fuel Weight [ZFW] is the total of the DOW+ Payload.

Maximum Zero Fuel Weight [MZFW]—is a design limiting weight. The actual ZFW should never exceed this weight.

The fuel quantities are expressed in weight units.

Fuel On Board [FOB] is the total amount of fuel in the fuel tanks before starting the engines.

Taxi fuel is the quantity of fuel required to start the aircraft engines and taxi to the takeoff position. The takeoff position is also referred to as the Brake Release [BR] point.

Takeoff fuel equals to FOB less the taxi fuel and is the amount of fuel available at the BR point.

Trip fuel is the amount of fuel required to fly the aircraft from the start of the take off run at the BR point of the departure airport till the touch down at the destination airport.

Reserve fuel is the amount of fuel required by the regulations of the civil aviation authorities, to have remaining in the fuel tanks upon touch down at the destination airport plus any extra quantity of fuel that is in the interest of the operator to carry (e.g. carrying fuel for the following flight sector where fuel price is higher).

Aircraft gross weight (also known as Ramp weight or Taxi weight) is the total aircraft weight at the ramp before engine start-up.

Maximum design Taxi weight—is a design limiting weight. The actual Taxi weight of the aircraft should never exceed this weight.

Aircraft takeoff weight [TOW] is the weight of an aircraft at the BR point and equals to the aircraft gross weight less the Taxi fuel.

Maximum design Take Off Weight [MTOW] is a design limiting weight. The actual TOW should never exceed this weight.

Maximum Permissible Take Off Weight [MPTOW] is the maximum permissible aircraft weight at the BR point as resulted due to the following variable factors: airport elevation, runway length and slope, outside air temperature, barometric pressure, prevailing wind, noise restrictions, obstacles in the takeoff flight path, runway surface conditions and the serviceability of aircraft components that affect the takeoff performance MPTOW should never exceed the MTOW.

Landing weight is the weight of an aircraft as it lands at the destination airport and equals to the aircraft weight at the BR point minus the trip fuel. It comprises of the zero fuel weight plus the Reserve fuel.

When twin-engine aircraft are flying across remote areas (e.g. oceans, deserts, etc.) the route must be carefully planned so that the aircraft can always reach an airport in case of an emergency (e.g. an engine failure). The rules applicable are named ETOPS—Extended-range Twin-engine Operational Performance Standards and LROPS—Long Range Operations.

Most Common Units of Measurement

Flight Plans incorporate a mixture of metric and non-metric units of measurement. The particular units used may vary by aircraft, by operator, and by location thus for example, different height units may be used at different points along a route during a single flight.

Distance units: Nautical Mile (NM)—Properly defined, one Nautical Mile is the length of 1 minute of arc of a Quadrant. It is variable in length. The average length of the NM is 6080 ft and is named the Standard NM. In practice however the Nautical Mile [NM] is referred to as such without mentioning the fact that it is a variable length.

Distances shown on Aviation charts are rounded to the nearest nautical mile, and these are the distances which are shown on a Flight Plan.

Systems for producing a Flight Plan need to use the actual values (un-rounded) in their internal calculations for improved accuracy.

Height Units—Feet or Meters.

The indicated height of an aircraft is based on the use of a pressure altimeter. The heights quoted here are thus the heights under standard conditions of temperature and pressure rather than the true heights. All aircraft using flight levels [FL] or Altitudes [ALT], calibrate their altimeters to the same setting (QNH or QNE) so reducing the risk of midair collision.

QNH is the altimeter setting to obtain the field elevation when on the ground.

In the air, when set to local/regional QNH, the altimeter will indicate the ALT in relation to MSL QNE—When altimeter is set to 1013.2 hPa or 29.92 inches it will indicate the Pressure Altitude.

For RVSM [Reduced Vertical Separation Minimum] approved operators/pilots, the vertical separation of aircraft is 1000 feet or 300 meters depending on the area flown.

For non-approved RVSM operators/pilots, the vertical separation of aircraft is 2000 feet or 600 meters depending on the area flown.

Speed Units

The most common speed unit used in producing a Flight Plan is the Knots i.e. the number of NMs in one hour.

Indicated Airspeed [IAS]—Airspeed indicator reading, as installed on the air craft, uncorrected for static source position error.

Calibrated Airspeed [CAS]—Airspeed indicator reading, as installed on the air craft, corrected for static source position error.

In most modern air crafts the differences between the IAS and CAS are negligible.

True airspeed [TAS] is the actual speed of the aircraft in relation to the air-mass through which the air craft is traveling.

Ground speed [G/S] is the actual speed of the aircraft in relation to the ground over which the air craft is traveling.

Mach number [Mach] is the ratio between the TAS and the Local speed of sound expressed as a percentage of the local speed of sound. (e.g. Mach 0.84 means that the TAS of the aircraft is 84% of the speed of sound that exists at the aircraft's environment.

Routes

A route is the path along the surface of the earth followed by an aircraft when flying between airports.

A route is divided into three main parts, Departure routes, Airways (or other predetermined route) and Arrival routes Departure routes usually referred to as Standard Instrument Departure [SID].

The departure routes define the flight path from a specific runway of the departure airport to a pre-selected waypoint on an airway, so that the aircraft can join the airway system in a controlled manner. Some of the climb portion of a flight will take place along the Departure route.

Airways

There is a worldwide coverage of airways. Each airway starts and finishes at a waypoint, and may include some intermediate waypoints. Airways may cross or join at a waypoint, so an aircraft can leave one airway and join another at such points. A complete route between airports often uses several airways. Where there is no suitable airway between two waypoints, and using airways would result in a somewhat roundabout lengthy route, air traffic control may allow a direct [DCT] waypoint to waypoint routing off airways.

Most waypoints are classified as compulsory reporting points, i.e. the pilot (or the automatic transmission of the onboard Flight Management System [FMS] reports the position of the aircraft to air traffic control as the aircraft passes over a waypoint.

There are two main types of waypoints. Named waypoints are shown on aviation charts with associated geographical co-ordinates (latitude and longitude). Such waypoints over land often have an associated radio beacon so that pilots can easily check the accuracy of the navigation. Useful named waypoints are always on one or more airways.

The Geographic waypoint is a temporary position used in a Flight Plan, usually in an area where there are no named waypoints, (e.g. most oceans) Air traffic control require that most geographic waypoints are expressed in whole degrees of latitudes and longitudes.

Arrival routes usually referred to as Standard Terminal Arrival Routes [STAR].

On approaching the airport of intended landing and prior the landing, the aircraft follows the Arrival route which defines a flight-path from a pre-selected waypoint along an airway to the landing runway, so that aircraft can leave the airway system in a controlled manner Some of the descent portion of a flight will take place along the Arrival route.

In locations where an airway structure cannot be setup (e.g. The North Atlantic area), special procedures are set by the appropriate authorities so that the safety of the flights will not be jeopardized and that operators do not suffer an un-acceptable financial loss.

Computing a Flight Plan

The result of the calculations while preparing a Flight Plan entails two main aspects: Time and Fuel.

Time—To be able to calculate the time required for an aircraft to travel between any two points along a route, the distance between these two points and the speed of the aircraft at this location must be known. Furthermore, to compensate for the effect of the wind on the G/S, the direction between the two points, and the wind direction & speed must also be known.

The OAT has an effect on the TAS and therefore must be known.

Summation of time: the following information must be fed into the computer to calculate the time between any two points:

Distance—calculated within the FMS/FMC.

Aircraft speed (Mach, TAS, CAS as applicable)—inherent in the FMS/FMC.

Wind direction & speed—must be inserted before the calculation.

OAT—must be inserted before the calculation.

Fuel—to be able to calculate the fuel burn-off between any two points it is required to know the Fuel Flow [FF] (the fuel burn-off per one hour) and the time during which this FF is applicable.

The F/F is embedded in the FMS/FMC once the aircraft weight is determined and a ALT/FL selected (It is sufficient to establish the ZFW of the aircraft to compute the Flight Plan.

Summation of fuel:—following information must be fed into the computer to calculate the fuel burn-off between any two points: [0283] FF—inherent in the FMS/FMC. [0284] Time—calculated within the FMS/FMC.

Weather Information

There are a few national weather centers which provide worldwide coverage weather forecasts for civil aviation in a pre-set format. These forecasts are generally issued every 6 hours, and cover the following next 36 hours at intervals of 6 hours. Each 6-hour forecast covers the whole world using grid-points located at pre-determined intervals (e.g. 75 NM). At each grid-point the weather (wind speed, wind direction, air temperature and barometric pressure) is supplied at different ALT/FL (e.g. 9 ALT/FL) including the practical range of ALT/FL (e.g. from about 4,500 feet up to about 55,000 feet.

Aircraft seldom fly exactly through weather grid-points or at the exact ALT/FL at which weather predictions are available, so some form of horizontal and vertical interpolation is generally required. For 75-NM intervals, linear interpolation is satisfactory.

Selection of Routes and ALT/FL

The route selected between any two points determines the ground distance to be flown while the winds prevailing along the route at a given TAS determine the G/S and the air distance (multiplying the time by the G/S will result in the ground distance while multiplying the time by the TAS will result in the air distance).

The regulation for determining the available ALT/FL's to fly vary from location to location over the globe and therefore will not always coincide with the optimum ALT/FL suitable for a specific aircraft at a given weight and the associated OAT prevailing.

The aircraft weight at any point determines the highest flight level which can be used. Cruising at a higher ALT/FL (but not above the 'optimum') generally requires less fuel than at a lower ALT/FL Fuel Flow The factors varying the FF are: [0291] Aircraft weight; [0292] ALT/FL; [0293] Aircraft speed; [0294] OAT; [0295] Usage of different number of air-conditioning and pressurization units; and [0296] Bleeding air from the engines for the Anti-ice system when flying in icing conditions. Factors to Consider when Selecting an Altitude (FL) to Fly [0297] Operational ceiling. (Altitude capability) [0298] Regulations [0299] Meteorological conditions—Consider Meteorological Hazards (Icing, Turbulence, Etc.), Winds Aloft, (Clouds & Visibility—for VFR flights), [0300] Safety Height [0301] VHF range—for short flights. [0302] Crew and passenger comfort.—Air density & Turbulence Factors to Consider when Selecting the Route to Fly [0303] Minimum time En-route [0304] Regulations [0305] Meteorological conditions—Consider Meteorological Hazards (Icing, Turbulence, Etc.), Winds Aloft, (Clouds & Visibility—for VFR flights). [0306] Safety Height (Consider A/C performance) [0307] Suitable en-route alternative airports. [0308] Radio & Navigation facilities along the route. [0309] Type of terrain [0310] Crew and passenger comfort. [0311] Availability of Air sea rescue facilities. Factors to Consider when Selecting Alternate Airports [0312] Weather at Alternate and en-route to alternate. [0313] Political consideration. [0314] Hours of operation—(Noise restrictions etc.) [0315] Flight time to Alternate and its location relative to the elected route. [0316] A/C handling facilities. (Fuel, Servicing, Loading & Offloading) [0317] Passenger handling. (Customs & immigration, Restaurant facilities) [0318] Radio & Navigation facilities at Alternate and en-route. [0319] Air traffic density. [0320] Regulations. (A.I.P.) [0321] Type of terrain en-route to and in the vicinity of the Alternate A/P. [0322] Crew's experience at the Alternate Airport. Factors to Consider when Selecting the Route to Fly [0323] Minimum time En-route [0324] Regulations [0325] Meteorological conditions—Consider Meteorological Hazards (Icing, Turbulence, Etc.), Winds Aloft, (Clouds & Visibility—for VFR flights). [0326] Safety Height (Consider A/C performance) Suitable en-route alternative airports. [0328] ETOPS/LROPS [0329] Radio & Navigation facilities along the route. [0330] Type of terrain [0331] Crew and passenger comfort. [0332] Availability of Air sea rescue facilities.

Point of No Return—PNR

Definition: A point along an aircraft's track beyond which a safe return cannot be made to a selected base within a stipulated time.

When required: The PNR is calculated for flights or sections of flights along which there are no suitable diversion airports so that in the event of the weather conditions at destination and destination alternate airports deteriorating below landing minima, it can easily be seen whether or not a return to a selected base can be made. In practice, a careful check of latest weather reports and forecasts for destinations will be made sometime before the PNR is reached.

Basic Formula:

$$t = P*H/(H+O)$$

or the ratio:

$$t/P = H/(H+O)$$

Where:

P=Endurance available for PNR calculation H=G/S Home (Back) i.e. PNR to a point A O=G/S Out i.e. a point A to PNR t=time to reach PNR Note: P is also referred to as "T" Note: P=FOB less the (Taxi Fuel+Planned Landing Fuel) Note: Other formulae may be used whereby the P equals to the quantity of fuel available for the PNR calculations. Note 1: Computer iterations may be required to accurately position the PNR. Note 2: when calculating the PNR, computer iterations may be used without the aid of the formula however, much iteration may be required Factors Affecting PNR:

Fuel available: Distance to PNR will vary directly with endurance available. [0338] Wind: Maximum distance to PNR is attained when zero wind conditions prevail. Any wind prevailing (other than zero) will reduce the distance for two reasons: (a) A head wind on a track will (except when flying up and downwind) always exceed the tailwind on the reciprocal track and so, the average of G/S O and H will be less than the TAS i.e. the range of the aircraft will be less than in still air. (b) The aircraft will be flying longer on the Leg into wind than on the equal distance Leg in the reverse direction, and so the overall head wind effect will exceed the overall tailwind effect and so reducing the range.

PET—Point of Equal Time:

The point of equal time is known also as ETP (Equal Time Point) or CPt—Critical Point)

Definition: A Point of Equal Time (PET) is a point along an aircraft's track from which the flying time to two selected bases is the same. The two bases are often the Departure and Destination airports.

Importance of PET: On flights or sections of flights along which no suitable alternate airports are available, a knowledge of the PET will enable a rapid decision to be made as to whether, in the event of an emergency situation developing (e.g. Fire, sickness, Engine failure etc.), it is quicker to return to a previous alternate or carry on to the next one.

It should be noted that in the event that the aircraft performance varies at the PET with a subsequent reduction in TAS, e.g. due to an engine failure, the reduced TAS must be used for the calculations from the PET to both bases. The ETA to the PET will still be calculated using the C/S Out based on the full TAS.

Formula:

$$x = D*H/(H+O)$$

or the ratio $$x/D = H/(H+O)$$

Where:

D=The distance between point A and B x=The distance from point A to PET H=G/S PET back to A
O=G/S PET on to B
(G/S=ground speed)

Note 1: Computer Iterations may be Required to Accurately Position the Pet.

Note 2: when calculating the PET, computer iterations may be used without the aid of the formula however, much iteration may be required Factors Affecting the Position of the PET:

Wind: In still air the PET will be at the mid point between the two selected bases, i.e. the air distance to either base is the same.

The PET will always move along track from the mid point into the wind.

TAS: In still air, a change of TAS has no effect on the position of the PET, however, with a wind existing, a reduction of TAS will have a similar effect to that caused by an increase in wind, i.e. the PET moves along track into the wind.

What is claimed is:

1. A flight planning system for constructing a flight plan for a flight of a specific aircraft of a specific model, the flight planning system comprising:
    (a) a flight management system (FMS/FMC) component which was previously tested and verified during flight for use on the specific aircraft of the specific model including: i) at least one processor, ii) an operating system, and iii) memory for storing executable code and data, wherein the stored data includes performance characteristics data of the specific aircraft of the specific model wherein said performance characteristics data was previously verified during actual flight of the specific aircraft, including at least a first and a second memory, wherein the first memory includes at least one of a volatile memory (VM) or a random access memory (RAM) and the second memory includes at least one of a non-volatile memory (NVM) or a read-only memory (ROM) and/or firmware;
    (b) a flight plan manager (FP-Manager) software module embedded within the memory of the FMS/FMC component;
    (c) an input interface for receiving and providing the flight plan manager with at least a portion of dynamic information;
    (d) the FMS/FMC component, by the at least one processor and the operating system, configured to load into the random access memory from the non-volatile memory and execute the embedded flight plan manager software module to: i) receive, via the input interface, dynamic information relating to the flight, ii) obtain the performance characteristics data of the specific aircraft of the specific model from the memory of the FMS/FMC component, and iii) construct a flight plan (FP) based at least in part on a portion of the obtained performance characteristics data and the received dynamic information, and based on computations executed at least in part by the FMS/FMC component processor, to include computations of long range operations requirement (LROPS) computations, whereby the distance from any point along the flight plan route to at least one specified diversion alternate airport does not exceed the LROPS approved distance for the aircraft; and,
    (e) an output interface for outputting the flight plan prior to the flight, the outputted flight plan parameters include at least: fuel on board, fuel reserve, aircraft gross weight, and point of equal time,
    wherein said previous testing of the flight management system (FMS/FMC) component during flight for use on the specific aircraft included at least the verification of a flight plan parameter related to trip fuel.

2. The flight planning system of claim 1, wherein the input interface includes a user interface.

3. The flight planning system of claim 1, wherein the input interface includes a receiver for wireless reception of at least a portion of the dynamic information.

4. The flight planning system of claim 1, wherein at least a portion of the dynamic information includes forecast outside air temperature (OAT) and forecast wind velocity (W/V) along the route.

5. The flight planning system of claim 1, wherein the outputted point of equal time (PET) is based on computations executed at least in part by the at least one processor to compute a point along a path of the flight plan from which the flying time to two specified airports is equal.

6. The flight planning system of claim 1, wherein the memory, includes one or more of:
    i) volatile memory (VM) or random access memory (RAM); and/or,
    ii) non-volatile memory (NVM) including read-only memory (ROM) and/or firmware.

7. A flight planning system for constructing a flight plan for a flight of a specific aircraft of a specific model, comprising:
    a) a flight management system (FMS);
    b) a flight management computer (FMC) which was previously tested and verified during flight for use on the specific aircraft of the specific model including:
        i) one or more memories to store executable code and to store data, the stored data including stored performance characteristics data of the specific aircraft that were previously verified during actual flights of the specific aircraft, including at least a first and a second memory wherein the first memory includes at least one of a volatile memory (VM) or a random access memory (RAM) and the second memory includes at least one of a non-volatile memory (NVM) or a read-only memory (ROM) and/or firmware, and,
        ii) an operating system,
        iii) at least one processor programmed to execute a flight plan computations based at least in part on long range operations requirement (LROPS), and extended twin-engine operations requirement (ETOPS) computations, wherein the distance from any point along the flight plan route to at least one specified diversion alternate airport does not exceed the LROPS/ETOPS approved distance for the specific aircraft;
    c) a flight plan manager (FP-Manager) operationally coupled to the FMS/FMC as one of: i) an embedded flight plan manager software module stored within the at least one or more memories of the flight management computer (FMC) or, ii) an add-on connected via an Application Program Interface (API) for interacting with the FMC operating system and/or processor;
    d) an input interface configured to receive at least a portion of the dynamic information relating to the flight, and;
    e) using one of: i) the embedded flight plan manager software module loaded into the random access memory from the non-volatile memory or ii) the flight plan manager add-on, to interact with the operating system and/or the at least one processor to: construct the flight plan prior to a flight of an specific aircraft the specific model, based on computations performed by the at least one processor using the at least a portion of the retrieved/obtained stored performance characteristics data of the specific aircraft from the one or more memories, and, a portion of the received dynamic information;

wherein the at least a portion of the stored performance characteristics data from the one or more memories includes at least a value of a maximum design taxi weight, and, the at least a portion of the received dynamic information includes at least a forecast of outside air temperature (OAT) and a forecast wind velocity (W/V), along a planned route of the flight plan.

8. The flight planning system of claim 7, additionally configured for computing the flight plan using the at least one processor to include parameters of: a) fuel on board, b) fuel to alternate and, c) time to alternate, d) estimated takeoff weight (TOW), and, e) estimated zero fuel weight (ZFW).

9. The flight planning system of claim 7, additionally configured to output at least one parameter of the flight plan to at least one of: a) an Application Program Interface (API), b) a display, c) a computer file, d) a printer, or, e) a transmitter.

10. The flight planning system of claim 7, additionally configured to automatically calculate, using the at least one processor, a plurality of different flight plan routes for a specific planned flight of the aircraft between two airports.

11. The flight planning system of claim 10, wherein the flight management computer enables selecting of a primary flight plan route from the plurality of different flight plan routes and storing the selected primary route within the flight management computer memory.

12. The flight planning system of claim 11, wherein the primary flight plan route is selected based on computations of at least one of:
a) a flight plan with least fuel consumption,
b) a flight plan with shortest total time,
c) a flight plan with a certain speed,
d) a flight plan with a certain flight level (FL)/altitude (ALT); or
e) a flight plan with least cost,
wherein the computations are performed within the flight management computer using the at least one processor.

13. The flight planning system of claim 10, wherein the flight management computer enables analysis and the selection of a secondary flight plan route from the plurality of the computed flight plan routes and storing the selected secondary flight plan route within the flight management computer memory.

14. The flight planning system of claim 7, wherein i) the one or more memory includes at least a first and a second memory and ii) wherein the first memory includes at least one of a volatile memory (VM) or a random access memory (RAM) and the second memory includes at least one of a non-volatile memory (NVM) or a read-only memory (ROM) and/or firmware.

15. A flight management computer for constructing a flight plan for a flight of a specific aircraft of a specific model, comprising:
a) an avionic flight management computer (FMC) which was previously tested and verified during flight for use on the specific aircraft of the specific model including: i) an embedded flight plan manager (FP-Manager); ii) one or more memory to store executable software/code and to store data, wherein said stored data includes stored performance characteristics data of the specific aircraft of the specific model that were previously verified during actual flights of the specific aircraft, including at least a first and a second memory and ii) wherein the first memory includes at least one of a volatile memory (VM) or a random access memory (RAM) and the second memory includes at least one of a non-volatile memory (NVM) or a read-only memory (ROM) and/or firmware, and at least one flight plan manager software module; iii) at least one processor, iv) an operating system, and, v) an input interface configured to receive dynamic information relating to the flight;

b) the flight management computer (FMC) is configured to construct a flight plan using the operating system that is configured to load the at least one flight plan manager software module into the first memory and the at least one processor to execute the at least one of the embedded flight plan manager software module stored on the first memory and compute a flight plan based on at least a portion of the performance characteristics data obtained from the one or more memory and at least a portion of the received dynamic information, the flight plan constructing including computations of at least long range operations requirement (LROPS) computations, whereby the distance from any point along the flight plan route to at least one specified diversion alternate airport does not exceed the LROPS approved distance for the aircraft; and, (c) an output interface,
wherein the flight management computer constructs a flight plan to include at least a parameter of: fuel on board, fuel to alternate, time to alternate; and outputs at least the parameter of fuel on board via the output interface.

16. The flight management computer of claim 15, wherein the received dynamic information includes at least: a) forecast outside air temperature (OAT) along the route, and, b) forecast wind velocity (W/V) along the route, and, the at least a portion of the static information includes at least a maximum zero fuel weight of the aircraft of the specific model.

17. The flight management computer of claim 15, wherein the at least one processor is additionally programed to compute the flight plan based on an extended twin-engine operations requirement (ETOPS) computations, wherein the distance from any point along the flight plan route to at least one specified diversion alternate airport does not exceed the ETOPS approved distance for the aircraft of the specific model.

18. The flight management computer of claim 15, additionally configured to output a predefined set of parameters of at least one of a) detailed flight plan, b) an ATC flight plan or, c) a dispatch release;
wherein the predefined set of parameters of the outputted detailed flight plan includes at least:
a) at least one of: an aircraft identification, an aircraft registration, an airline flight number, a name of pilot in command, or, an aircraft type,
b) departure airport and destination airport,
c) estimated time of departure,
d) at least: fuel on board, fuel to alternate, time to alternate, estimated takeoff weight, and, estimated zero fuel weight, and,
e) at least one of: a ground speed (G/S), true air speed (TAS) or MACH speed;
wherein the predefined set of parameters of the outputted ATC flight plan includes at least:
a) at least one of: an aircraft identification, an aircraft registration, an aircraft type, or, a name of pilot in command, b) departure airport and destination airport,
c) estimated time of departure, and;
d) at least: route, alternate airport, cruising speed, cruising level, estimated elapsed time, and, endurance; and, wherein said predefined set of parameters of the outputted dispatch release includes at least:
a) at least one of: an aircraft identification, an aircraft registration, a flight number, an aircraft type, or, a name of pilot in command,
b) departure airport and destination airport,
c) estimated time of departure,
d) flight rules,
e) route,
f) at least: fuel on board, takeoff fuel, alternate airport, and;
g) at least one of: trip fuel, alternate fuel, or, reserve fuel.

19. The flight management computer of claim 15, wherein the output interface is additionally configured to output at least one parameter of the flight plan to at least one of: a) an Application Program Interface (API), b) a display, c) a computer file, d) a printer, or, e) a transmitter.

20. A flight planning system for constructing a flight plan for a flight of a specific aircraft of a specific model, the flight planning system comprising:
(a) a flight management system (FMS/FMC) component including: i) a processor, ii) an operating system, and iii) data storage memory, wherein the data stored in the data storage memory includes stored performance characteristics data of the specific aircraft of the specific model that was previously verified during actual flights of the aircraft, including at least a first and a second memory, and ii) wherein the first memory includes at least one of a volatile memory (VM) or a random access memory (RAM) and the second memory includes at least one of a non-volatile memory (NVM) or a read-only memory (ROM) and/or firmware;
(b) a flight plan manager (FP-Manager) operationally coupled to the FMS/FMC component as an add-on module for interacting with the FMS/FMC component via an Application Program Interface (API);
(c) an input interface for receiving and providing the flight plan manager with at least a portion of dynamic information relating to the flight,
(d) the flight plan manager configured for; i) obtaining, via the API, at least a portion of the performance characteristics data relating to the specific aircraft of the specific model from the flight management system FMS/FMC component data storage memory, ii) obtaining, via the input interface, at least a portion of the received dynamic information relating to the flight, and, iii) constructing a flight plan based at least in part on interaction with the FMS/FMC component operating system via the API, using said at least a portion of the dynamic information and at least a portion of the performance characteristics data, and, based on computations executed at least in part by the FMS/FMC component processor, wherein the computations include:
a long range operations requirement (LROPS) computations, whereby the distance from any point along the flight plan route to at least one specified diversion alternate airport does not exceed the LROPS approved distance for the specific aircraft of the specific model, and,
a point of equal time (PET) computations, of a point along the flight plan path from which the flying time to two specified airports is equal, and;
(e) an output interface for outputting the flight plan, the outputted flight plan parameters include at least: fuel on board, fuel reserve, aircraft gross weight, and point of equal time.

21. A method of constructing a flight plan for a flight of a specific aircraft of a specific model, the flight planning system comprising:
test flying a specific aircraft of a specific model before release during actual flight conditions to i) verify the reliability of its flight management system FMS/FMC component and its processors, ii) verify the reliability of the stored performance characteristics data of the specific aircraft of the specific model stored within the memory of its FMS/FMC component and iii) verify that the aircraft is performing as intended by the aircraft manufacturer by at least comparing and verifying the actual remaining fuel with the planned remaining fuel at a selected point of the flight plan, wherein the flight management system FMS/FMC includes: i) at least one processor, ii) an operating system, and iii) memory for storing executable code and data, including at least a first and a second memory, wherein the first memory includes at least one of a volatile memory (VM) or a random access memory (RAM) and the second memory includes at least one of a non-volatile memory (NVM) or a read-only memory (ROM) and/or firmware;
providing an input interface for receiving dynamic information relating to a flight;
embedding a flight plan manager, configured to produce a flight plan within the memory of the FMS/FMC component;
producing a flight plan, by the flight plan manager, for the flight of the specific aircraft of the specific model, using the FMS/FMC component that was previously tested and verified for use on this specific aircraft of the specific model prior to its release, wherein said flight plan producing is based on at least a portion of the performance characteristics data stored within the FMS/FMS component memory and at least a portion of the dynamic information relating to the flight received via the input interface, and based on computations executed at least in part by the previously tested and verified FMS/FMC component processor, to include computations of long range operations requirement (LROPS) computations, whereby the distance from any point along the flight plan route to at least one specified diversion alternate airport does not exceed the LROPS approved distance for the specific aircraft of the specific model; and,
using an output interface for outputting the flight plan prior to the flight, the outputted flight plan parameters include at least: fuel on board and point of equal time.

* * * * *